United States Patent [19]
Tollrian et al.

[11] 3,986,078
[45] Oct. 12, 1976

[54] DEVICES FOR LIMITING THE OUTPUT VOLTAGE OF CURRENT-CONTROLLED REMOTE FEED APPARATUSES

[75] Inventors: Herwig Tollrian, Nurnberg; Günter Weinfurtner, Feucht, both of Germany

[73] Assignee: Tekade Felten & Guilleaume Fernmeldeanlagen GmbH, Nurnberg, Germany

[22] Filed: May 1, 1975

[21] Appl. No.: 573,513

[30] Foreign Application Priority Data
May 10, 1974 Germany............................ 2422729

[52] U.S. Cl..................................... 317/16; 317/31; 317/33 SC; 321/45 C; 323/22 SC
[51] Int. Cl.².......................................... H02H 3/20
[58] Field of Search............ 323/22 SC; 317/16, 31, 317/33 VR, 33 SC; 321/45 C

[56] References Cited
UNITED STATES PATENTS

| | | |
|---|---|---|
| 3,382,409 | 5/1968 | Assow et al............................ 317/16 |
| 3,407,335 | 10/1968 | Hartung............................. 317/31 X |
| 3,593,063 | 7/1971 | Cavil..................................... 317/16 |
| 3,663,942 | 5/1972 | Jakobsen............................. 321/45 C |
| 3,683,267 | 8/1972 | Akamatsu............................ 321/45 C |
| 3,818,274 | 6/1974 | DeWitte et al................. 317/33 VR |

*Primary Examiner*—Gerald Goldberg
*Attorney, Agent, or Firm*—Haseltine, Lake & Waters

[57] ABSTRACT

A circuit for connecting to the output of a constant-current power supply for limiting output voltage in the event of an interruption, such as open circuits, in a feed comprises a first resistor and a first thyristor in series across the output and a second resistor and a second thyristor in series across the output, a capacitor connecting the junction of the first resistor with the first thyristor to the junction of the second resistor with the second thyristor. Triggering of the first resistor connects the first resistor to the output so as to form a dummy load and triggering of the second thyristor turns off the first thyristor.

4 Claims, 4 Drawing Figures

3,986,078

DEVICES FOR LIMITING THE OUTPUT VOLTAGE OF CURRENT-CONTROLLED REMOTE FEED APPARATUSES

BACKGROUND OF THE INVENTION

The present invention relates to devices for limiting the output voltage of current-controlled remote feed apparatuses in the event of an interruption in feed circuits.

In transmitting messages through cable links in carrier frequency technology, for example in the V 300, V 960, V 2700 and V 10800 systems, the intermediate amplifiers are supplied with the necessary energy by remote means from the terminal stations through the same coaxial inner conductors through which the message signals are also transmitted by frequency multiplex. Remote power separating filters in the terminal feed stations isolate the carrier-frequency message signals from the remotely fed supply current. The remote feed itself is supplied in accordance with the so-called constant-current d.c. series feed. In this system the intermediate amplifiers are d.c. series connected and the voltage drop across the amplifier represents the operating voltage thereof. Since the amplifiers are of identical construction and the same constant current flows through each, it follows that each is supplied with the same operating voltage. Regulating devices are required only in the feeding apparatus at the terminal stations.

The remote feed voltage which occurs on the terminals of the remote feed apparatus depends on the number of intermediate amplifiers which are supplied by this voltage; in the initially-mentioned systems, this voltage reaches a maximum value between 480 and 600 V. If the remote feed circuit is interrupted, for example in the event of cable fracture or if one of the intermediate amplifiers is withdrawn, the control devices of the feed apparatus will attempt to drive the current by increasing the voltage. The consequence would be high excess voltages which could endanger the transmission equipment. Furthermore, arresters provided as lightning protection for the system would come into action and might be destroyed by the feed energy or be rendered useless for extension purposes. To avoid these effects the voltage is limited when an upper threshold is exceeded by switching an additional load resistance between the remote feed cores, the resistance being so low that the remote feed voltage is limited to a specific maximum value of approximately 60 V. The said voltage of 60 V also represents a harmless voltage if touched by persons at the position at which there is an open circuit. The additional load resistance is automatically switched off as soon as the remote feed line is restored.

Electromagnectic relays were hitherto used for switching the additional load resistance on and off (Siemens Zeitschrift 45 (1971), Nachrichtenubertragungstechnik Supplement, pp. 118–121). A total of three electromagnetic relays are required in this known arrangement.

It is an object of the invention to provide electronic means for switching the additional load resistance into and out of circuit.

SUMMARY OF THE INVENTION

The present invention consists in a device for a remote feed apparatus with control of current in communications technology for switching an additional load resistance in the event of an interruption in the remote feed circuit, wherein the additional load resistance can be connected into circuit by a first thyristor which is associated with a reverse switching device comprising a load resistor, a capacitor and a second thyristor which, after being fired, again drives the first thyristor to cut-off.

The present invention also consists in a device for limiting the output voltage of a feed apparatus with control of current in the event of an interruption in a feed circuit, comprising a first resistor and a first thyristor, connected in series and for connection across the remote feed apparatus output, a second resistor and a second thyristor connected in series between the ends of the series combination of the first resistor and the first thyristor and with a capacitor connected between the junction of the first resistor with the first thyristor and the junction of the second resistor with the second thyristor, and means for triggering the first thyristor when the output voltage exceeds a limit value, triggering of the second thyristor serving to turn off the first thyristor.

BRIEF DESCRIPTION OF THE DRAWING

A preferred embodiment according to the invention will be described with reference to the accompanying drawings, in which.

DESCRIPTION OF THE PREFERRED EMBODIMENTS

Figure 1:
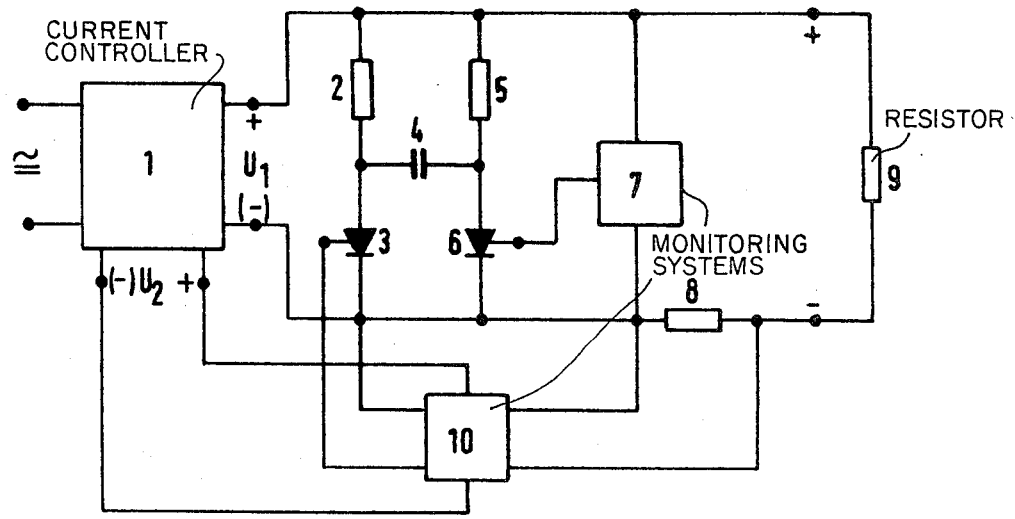
FIG. 1 is a block circuit diagram of a device according to the invention.

A constant-current controller 1 as shown in FIG. 1, is driven from a d.c. or a.c. mains. It produces a voltage U1 for a remote feed and supplies a current which is maintained at a constant value. The loads connected to the remote feed line are represented by a resistance 9. A unit 7 monitors the remote feed voltage U1 and transmits a signal for switching an additional load resistance 5 into circuit if the remote feed voltage exceeds a pre-defined limiting value. To this extent the system corresponds to the prior art. According to the invention, the said signal fires a thyristor 6 which is connected in series with the additional load resistance 5 across the feed voltage U1. The value of the resistance is such that a reduced voltage U1 of approximately 60 V is obtained through the regulating device of the constant-current unit 1 at the current which flows when the load resistance is switched into circuit. This condition is obtained automatically if the remote feed voltage U1 increases excessively on the remotely fed line, for example in the event of an open-circuit line in the remote feed circuit.

According to the invention, a further thyristor 3 is provided for automatically switching the system back to normal operation, the said thyristor being controlled by the monitoring device 10. The monitoring device 10 tests the voltage drop across the resistor 8 which is connected into the remote feed circuit. As soon as a current, the magnitude of which is defined by the correctly operating remote feed line at the reduced voltage of 60 V, flows through the resistor 8 the monitoring system 10 will deliver a pulse which fires the thyristor 3. The thyristor 3 and its series resistor 2 are connected to the remote feed voltage U1. The capacitor 4 connected between the anodes of the two thyristors is essential for reverse switching. The function of the capacitor is as follows: when the remote feed line operates correctly both thyristors are extinguished, the capacitor 4 is uncharged and both its electrodes are connected to the positive potential. After the thyristor 6 is fired the right-hand electrode of the capacitor is connected through the thyristor 6 to the negative lead and accordingly the capacitor 4 is charged through the resistor 2 to the available remote feed voltage of approximately 60 V. If the second thyristor 3 is also fired for reverse switching of the system, the discharge current of the capacitor 4 will flow through the second thyristor 3 and through the thyristor 6, the said discharge current flowing opposite to the original current through the thyristor 6 in such a way that the thyristor 6 will then be extinguished. The value of the series resistor 2 for the thyristor 3 is such that the current flowing through it is less than the holding current of the thyristor 3 so that this will be extinguished when the additional current obtained from the discharging of the capacitor 4 drops below a limiting value. Both thyristors will then again be extinguished. It should be mentioned that the monitoring system 10 is supplied from a separate auxiliary voltage U2 obtained from the constant-current regulating apparatus 1.

Figure 2:
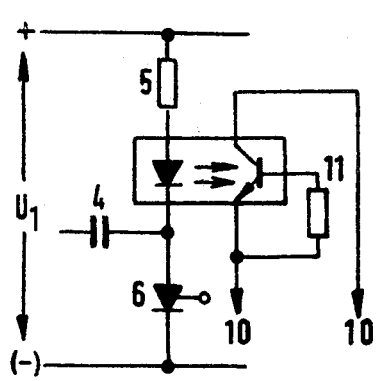
FIG. 2 is a circuit diagram of part of the device of FIG. 1 showing an additional feature.

The additional arrangement shown in FIG. 2 is provided in a further embodiment of the system according to the invention in order to prevent possible pulses from the circuit interferring with the monitoring system 10. According to the further development, the thyristor 6 and its series resistor 5 is associated with an opto-electronic coupling element; the output signal thereof is supplied to the monitoring system 10 where it permits the transmission of a firing signal to the thyristor 3 only if the thyristor 6 is conductive.

Figure 3:
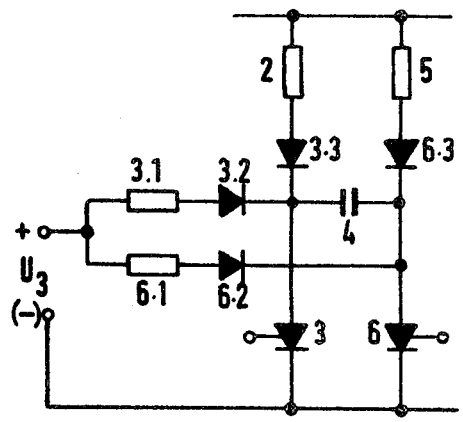
FIG. 3 is a circuit diagram of a further development of the device of FIG. 1.

Automatic constant-current regulating systems in remotely fed telecommunications systems are occasionally switched for testing and monitoring purposes so that the currents flowing through the remote feed circuits are substantially lower than in normal operation. In order to enable the system according to the invention to be operational even in this case, an auxiliary voltage U3 is supplied to the thyristors 3 and 6 where necessary through resistors 3.1 or 6.1, as shown in FIG. 3. This ensures that the charge supplied to the capacitor 4 is higher than that from the lower current from the reduced supply voltage U1 and the additional current fed into the system and obtained from the auxiliary voltage U3 ensures that the holding current required for maintaining the thyristor 6 in the fired state is sufficiently high. Diodes 3.2, 3.3, 6.2, 6.3 are provided to decouple the various circuits.

Figure 4:
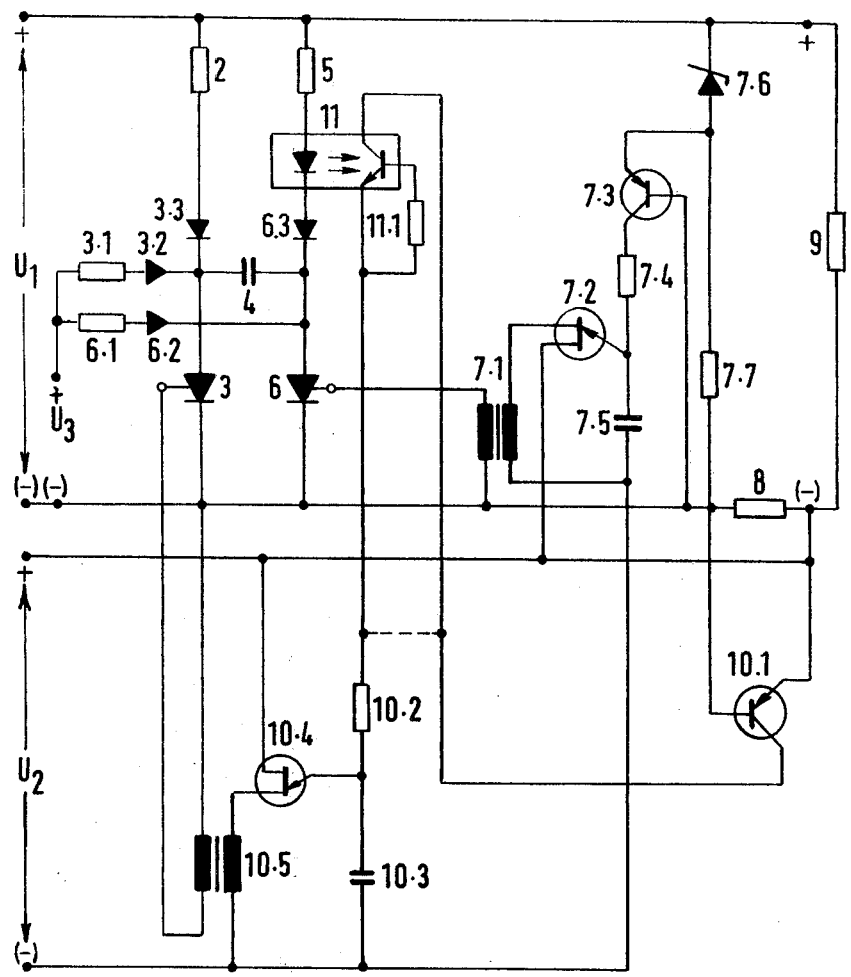
FIG. 4 is a complete circuit diagram of the device of FIG. 1.

FIG. 4 shows in simplified form the circuit of one embodiment of the system according to the invention. The interconnection of the systems according to FIGS. 1 to 3 can be seen from the identical reference numerals for the individual circuit elements. The monitoring systems 7 and 10 are shown in more detail.

The monitoring system 7 comes into operation if the remote feed voltage exceeds the specified limiting value towards higher voltage values. A Zener diode 7.6 with its series resistor 7.7 is arranged to become conductive when the voltage is exceeded in the manner described. A current will then flow through the base of a transistor 7.3 and the emitter-base junction thereof will be conductive; a capacitor 7.5 is therefore charged through a resistor 7.4. When the capacitor voltage reaches a specific magnitude, the base-emitter junction of the unijunction transistor 7.2 will become conductive and the capacitor 7.5 will be discharged through the primary winding of the transformer 7.1. The pulse occurring on the secondary winding of the transformer 7.1 drives the thyristor 6 into its conductive state. As already described above, this reduces the remote feed voltage to approximately 60 V and the monitoring system 7 becomes dead but the thyristor 6 remains in its fired state.

The monitoring system 10 provides for the extinction of the thyristor 6 when the remote feed circuit is again restored to correct operation. The monitoring system 10 monitors the voltage drop across the resistor 8 which is connected in the remote feed circuit. The transistor 10.1 becomes conductive as soon as the aforementioned voltage drop reaches a value corresponding to a correctly operating remote feed circuit and a reduced feed voltage. The collector of the said transistor charges a capacitor 10.3 through a resistor 10.2. A pulse for firing the thyristor 3 is transmitted in a similar manner to that previously described through a unijunction transistor 10.4 and a transformer 10.5.

If the remote feed circuit is in order, this arrangement would however periodically generate pulses, i.e. the thyristor 3 would be repeatedly fired at specific time intervals. Since the resistor 2 has a relatively high ohmic value, this would result only in an insignificant additional loading of the power supply device for the remote feed circuit. Undesirable firing could however interfere with the equipment of the line. The opto-electronic coupling element 11 and bias resistor 11.1 are therefore connected in the collector circuit of the transistor 10.1 so as to permit a collector current to flow only if the thyristor 6 has been fired. A firing pulse for the thyristor 3 therefore appears only when the thyristor 6 is conductive.

Various modifications may be made within the scope of the invention.

We claim:

1. A device for limiting the output voltage of a feed apparatus with control of current in the event of an interruption in a feed circuit, comprising a first resistor, a first thyristor, a second resistor, a second thyristor, a capacitor, means for triggering said first thyristor when said output voltage exceeds a limit value, a first series combination of said first resistor and said first thyristor connected together at a first junction and a second series combination of said second resistor and said second thyristor connected together at a second junction, said first combination and said second combination being connected in parallel and said capacitor being connected between said first junction and said second junction, wherein triggering of said second thyristor serves to turn off said first thyristor.

2. A device according to claim 1, including further means for triggering said second thyristor when current in said feed circuit returns to a normal value.

3. A device according to claim 2, including an opto-electronic coupling element connected in series with said first resistor and arranged to block the triggering of said second thyristor when said first thyristor is non-conducting.

4. A feed apparatus comprising a power supply with control of current having an output and a device connected to said output for limiting the voltage thereacross in the event of an interruption in a feed circuit, said device comprising a first resistor, a first thyristor, a second resistor, a second thyristor, a capacitor, means for triggering said first thyristor when said output voltage exceeds a limit value, a first series combination of said first resistor and said first thyristor connected together at a first junction and a second series combination of said second resistor and said second thyristor connected together at a second junction, said first combination and said second combination being connected in parallel and said capacitor being connected beween said first junction and said second junction, wherein triggering of said second thyristor serves to turn of said first thyristor.

* * * * *